Patented July 27, 1926.

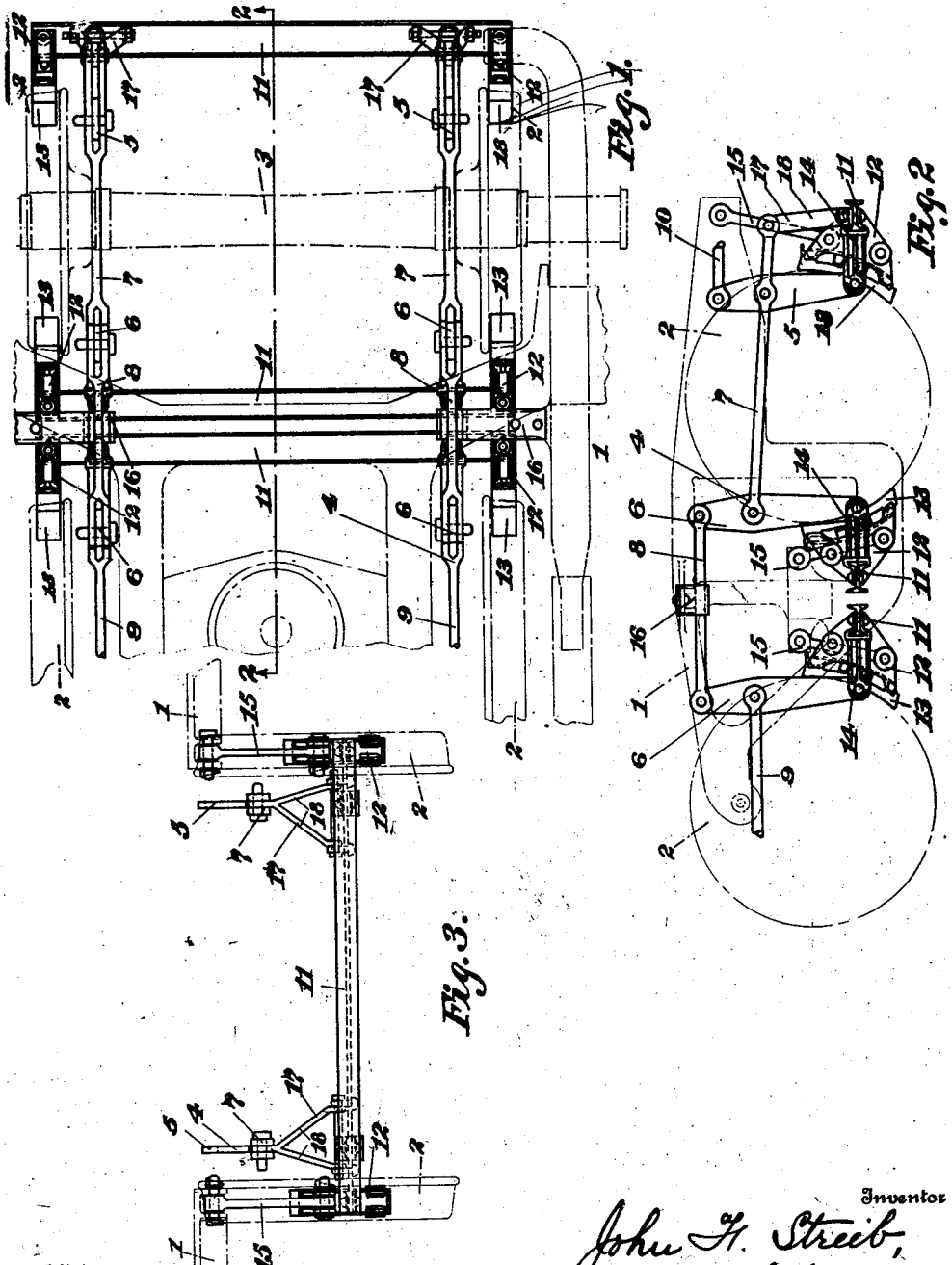

1,593,919

UNITED STATES PATENT OFFICE.

JOHN F. STREIB, OF AVALON, PENNSYLVANIA, ASSIGNOR TO PRESSED STEEL CAR COMPANY, OF PITTSBURGH, PENNSYLVANIA, A CORPORATION OF NEW JERSEY.

BRAKE RIGGING.

Application filed June 7, 1921. Serial No. 475,650.

This invention relates to railway truck brakes and has for an object the provision of means for supporting the brake and for maintaining a brake beam in such a position that the entire faces of the brake shoes attached to the beam will be substantially equidistant from the tread of the wheel when the braking power is released.

Another object of the invention is to provide means whereby a brake lever and rod of a brake rigging is supported from a brake beam.

These and other objects will be apparent from the following description.

Referring to the drawing, in which like reference characters refer to like parts, Fig. 1 is a plan view of a portion of a brake applied to a railway car truck and embodying the invention, the truck frame and wheels being shown in dot and dash lines; Fig. 2 is a sectional view of the same taken on the line 2—2 of Fig. 1, and Fig. 3 is an end elevational view of the same.

Referring now in detail to the drawing, the reference character 1 indicates the truck frame which may be of any suitable form or construction and 2 the truck wheels which are mounted on axles 3 which are rotatably mounted in suitable axle boxes (not shown) mounted in the truck frame.

The reference character 4 indicates the brake which preferably comprises two sets of connected levers and rods, one set being arranged at each side of the truck. Each of these sets comprises a lever 5 which is arranged adjacent one side of the end wheel of the truck and a lever 6 which is arranged adjacent the opposite side of the same wheel, which levers, intermediate their ends are connected by a longitudinally disposed rod 7. The upper end portion of the lever 6 is connected with the upper end portion of a similar lever 6 arranged adjacent one side of an adjacent wheel by a rod 8. Adjacent the opposite side of this wheel another lever 6 (not shown) is arranged. Intermediate their ends these last mentioned levers 6 are connected through the medium of a rod 9. The upper ends of the lever 5 are connected with pull rods 10 which rods may be connected with the usual equalizing mechanism (not shown).

At each side of each pair of wheels a brake beam 11 is provided which extends transversely of the truck and at its ends is provided with brake heads 12 which in turn are provided with shoes 13 adapted to engage the tread of the wheel when the braking power is applied. At their lower ends, each of the brake levers is connected with one side of one of the brake beams 11 preferably through the medium of a member 14 which is rigidly secured to the brake beam and pivotally connected with the brake lever.

The brake beams are supported from the truck frame by means of hangers 15 each of which at one end is pivotally connected with the truck frame and at the opposite end is connected with one of the brake heads. To support the levers 6 and rod 8 connecting them a bracket 16 is provided which is secured to the truck frame and extends inwardly therefrom and upon this bracket the rod 8 is adapted to rest.

Each of the rods 7 is extended some distance outwardly beyond the lever 5 and at its end is pivotally connected with the upper end portion of a member 17. Below the rod 7 this member is preferably provided with spaced portions 18 which at their lower ends are pivotally connected with the brake beam, at the side opposite that to which the lever 5 is connected. It will here be noted that the brake beam 11 is supported by the hanger 15, and the beam so supported will in turn support the lever 5 and the rod 7 through the medium of the member 17 and the connecting means between the lower end of the lever 5 and the beam. The lever 5 and the member 17 are spaced apart and arranged substantially parallel to each other, and as the distance between their points of connection with the rod 7 and the beam is substantially unchangeable, these elements, as the brake is operated, will remain substantially parallel, thus holding the beam substantially level, i. e., in its proper initial position at all times so that the entire faces of the brake shoes connected therewith will be substantially equidistant from the tread of the wheel and will prevent the beam and head and shoes attached thereto from rotating around the point of connection between the hanger 15 and the head thus preventing the shoe from dragging on the wheel when the braking power is released. It will further be noted that the spaced portions 18 form a wide bearing base for the member 17 and is adapted to prevent undue lateral movement of the brake lever 5.

The term "level" as used in connection with the brake beam in the foregoing description and appended claims, is intended to mean the maintaining or holding of the brake beam in its initial position against tilting, whether it be disposed in a horizontal plane, or at an angle thereto.

It will be apparent to those skilled in the art to which this invention appertains that many minor changes may be made in the construction and arrangement of the parts forming the invention without departing from the spirit and scope of the appended claims.

Having thus described the invention what I claim as new and desire to secure by Letters Patent is:—

1. In a brake rigging, a brake beam, a brake lever, a brake rod connected with said lever above said beam, and a member pivotally connected with said beam and rod adapted to support said rod and lever from said brake beam.

2. In a brake rigging, a brake beam, a brake lever, a brake rod above said beam and connected to said lever, and extending beyond the same, and a member connecting said beam and rod.

3. The combination with car truck wheels, of brake shoes adapted to engage said wheels, a brake beam connected with said shoes, a brake lever connected with one side of said beam, a brake rod connected with said lever, and means connected with said rod and the opposite side of said beam for supporting said lever and rod.

4. The combination with a car truck, of brake shoes adapted to engage the wheels of said truck, brake beams connected with said shoes, means for supporting said beams from said truck, brake levers connected with said beams, rods connecting said levers above said beams, and means for supporting one of said levers and rods from one of said beams, and means for supporting the other levers and rods from the truck.

5. In a brake rigging, a brake beam, and means for maintaining said beam level, said means comprising a plurality of spaced members connected with opposite sides of said beam, said members being substantially parallel to each other, and means spaced away from said beam for connecting said members together.

6. In a brake rigging, a brake beam, a brake lever connected with one side of said beam, a brake rod connected with said lever above said beam and a member connected with the opposite side of said beam and with said rod, said member being spaced away from said lever and parallel therewith.

In testimony whereof I affix my signature.

JOHN F. STREIB.